United States Patent [19]
Irvin et al.

[11] Patent Number: 4,798,433
[45] Date of Patent: Jan. 17, 1989

[54] OPTICAL PRESSURE SEALING COUPLING APPARATUS

[75] Inventors: Timothy B. Irvin, Woodland Hills; Richard E. French, Simi Valley, both of Calif.

[73] Assignee: The United States of America as represented by the Administrator of the National Aeronautics and Space Administration, Washington, D.C.

[21] Appl. No.: 156,518

[22] Filed: Feb. 16, 1988

[51] Int. Cl.$^4$ ................................................ G12B 6/38
[52] U.S. Cl. ................................ 350/96.21; 350/96.25
[58] Field of Search ............... 350/96.20, 96.21, 96.22, 350/96.23, 96.24, 96.25, 96.26

[56] References Cited
U.S. PATENT DOCUMENTS

| | | | |
|---|---|---|---|
| 4,341,439 | 7/1982 | Hodge | 350/96.22 |
| 4,432,603 | 2/1984 | Morency et al. | 350/96.21 |
| 4,444,516 | 4/1984 | Dostoomiam et al. | 374/131 |
| 4,469,399 | 9/1984 | Cowen et al. | 350/96.20 |
| 4,509,827 | 4/1985 | Cowen et al. | 350/320 |
| 4,598,290 | 7/1986 | Collins et al. | 340/850 |
| 4,687,293 | 8/1987 | Randazzo | 350/96.23 |

*Primary Examiner*—William L. Sikes
*Assistant Examiner*—Frank González
*Attorney, Agent, or Firm*—William J. Sheehan; John R. Manning; Charles E. B. Glenn

[57] ABSTRACT

Apparatus for optically coupling and pressure sealing sections of an instrumentation probe, one of the sections being at a high pressure cryogenic environment and the other section being at ambient pressure. The apparatus includes a housing having a passageway within which elements are mounted for precisely locating a rigid optical fiber coupler and the probe sections so as to optically connect and maintain the ends of the probe sections together to permit signals to pass in both directions through the joint in two or more discrete channels. An adjustable positioning member acts to connect the external section of the probe to the housing in axial and rotation alignment with the interior section.

16 Claims, 1 Drawing Sheet

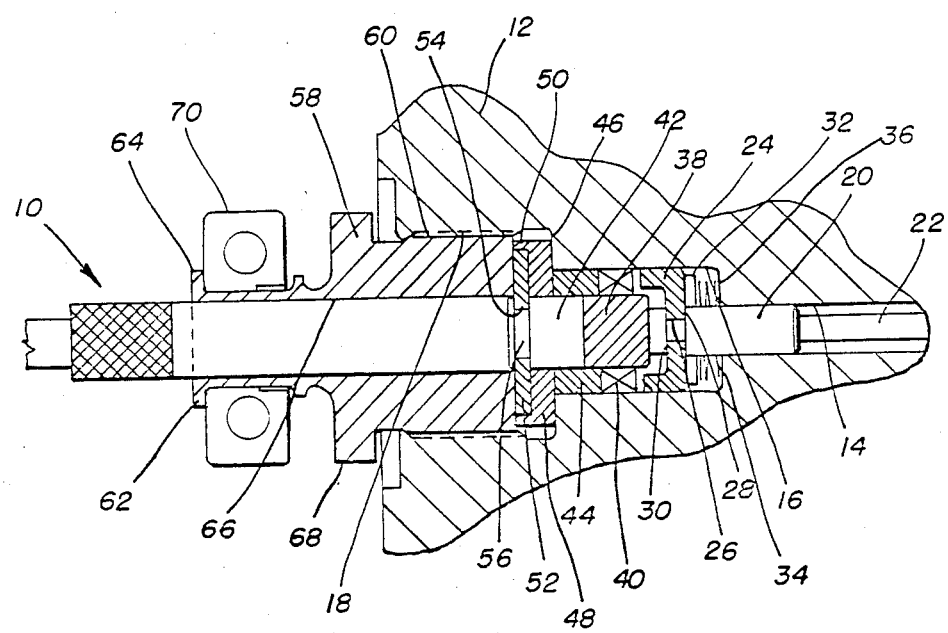

OPTICAL PRESSURE SEALING COUPLING APPARATUS

ORIGIN OF THE INVENTION

The invention described herein was made in the performance of work under a NASA contract and is subject to the provisions of §305 of the National Aeronautics And Space Act of 1958, Public Law 85-568 (72 Stat. 435; 42 U.S.C. 2457).

BACKGROUND OF THE INVENTION

This invention relates to connecting optical fiber sections and more particularly to optical fiber coupling apparatus providing pressure sealing at an optical joint having high pressure cryogenic media on one side of the joint and ambient conditions on the other side, the coupling permitting transmission of signals through two or more discrete optical channels.

Optical fiber connectors are used for connecting two or more optical fibers in such a way that the optical signal may pass from one fiber to another at a joint therebetween. The transmission of information in the form of optical signals has increased greatly but the quality of the coupling between the fiber segments is critical to the quality of the transmission of the signals through the joint. Consequently, contact and precise alignment between the optical components is important to minimize the attenuation of the optical signal at the connection.

Although pressure tolerant couplings are known in the prior art for use in underwater applications where the pressure is the same on both sides, as disclosed in Morency et al. U.S. Pat. No. 4,432,603, and in underwater applications through a bulkhead having a high pressure differential wall, such as disclosed in Cowen et al., U.S. Pat. No. 4,469,399, and in applications where a probe is used for measuring temperature molten plastic or metal under high pressure, such as disclosed in Dostoomian et al., U.S. Pat. No. 4,444,516, a problem which has not been addressed by the prior art is that of coupling optical fibers not only where there is a high pressure differential across the coupling joint, but also where one end of the probe must be physically located at the high pressure and at extremely low temperatures. This problem is presented for instrumentation probe feedthrough applications relating to the space program. For example, a fiber optic probe is utilized for a bearing deflectometer to obtain data relating to the high pressure oxidizer turbopump utilized in the space shuttle main engine. Pressurized oxygen at cryogenic temperatures and pressures of approximately 600 lbs. per square inch are presented at the measuring end of the probe for monitoring by instrumentation located at ambient pressure.

SUMMARY OF THE INVENTION

Consequently, it is a primary object of the present invention to provide optical coupling apparatus for pressure sealing feedthrough of a fiber optic probe used for monitoring at ambient conditions apparatus operating under high pressure cryogenic conditions.

It is another object of the present invention to provide an optical pressure sealing coupler sealing against a high pressure differential with cryogenic temperatures at the high pressure zone.

It is a further object of the present invention to provide optical pressure sealing coupling apparatus for a probe monitoring apparatus under high pressure cryogenic conditions through an interface having ambient pressure at the other side thereof, the coupling acting to seal the probe feedthrough while optically connecting sections of the probe at the interface so that two or more discrete channels are maintained through the connecting joint.

Accordingly, the present invention provides an optical fiber coupling apparatus for instrumentation feedthrough applications, the apparatus acting to seal a high pressure cryogenic environment at one side of an optical connecting joint from an ambient pressure environment at the other side while permitting transmission of two or more discrete optical channels through the joint. Thus, the coupling acts to optically connect a section of the probe at the high pressure cryogenic conditions with another section at external ambient conditions. The coupling combines the functions 10 of connecting and sealing the probe and eliminates the need to provide separate independent sealing for the probe itself. The apparatus includes an adjustable member for permitting axial and rotational adjustment of the exterior or monitoring section of the probe for alignment with the measuring section of the probe on the other side of the joint so as to optimize the transmission of the optical signals.

The coupling includes a housing having means for precisely locating a rigid optical fiber coupler and the probe sections for optically connecting and maintaining the ends of the probe sections together to permit light signals to pass in both directions through the joint, and positioning means for connecting the external section of the probe to the housing and for adjustably aligning the external section with the internal section to maintain discrete optical channels through the coupling.

BRIEF DESCRIPTION OF THE DRAWING

The particular features and advantages of the invention as well as other objects will become apparent from the following description taken in connection with the acompanying drawing, in which:

The figure is a diagrammatic cross sectional view partly broken away of a pressure sealing optical fiber coupling assembly constructed in accordance with the principles of the present invention.

DESCRIPTION OF THE PREFERRED EMBODIMENT

Referring to the drawing an optical coupling or light joint is provided by the present invention for an instrumentation probe 10 proposed for monitoring the performance of a component, such as a bearing, in a high pressure environment, such as in the high pressure oxidizer turbopump used in the main engine of the space shuttle wherein the oxygen is under cryogenic conditions at a pressure in the order of 600 psi. However, probe 10 may be utilized in environments in which the probe may be exposed to internal pressures in the range of from about 1 psi to about 5,000 psi. Thus, the measuring end of the probe is disposed in the pressurized cryogenic environment, while the exterior or monitoring end of the probe is at ambient pressure. It is therefore necessary to maintain proper sealing to avoid leakage of the high pressure medium to the ambient pressure side while permitting the probe to extend through the interfacial joint between the high pressure side and the low pressure side while optimizing the optical coupling through the interface so as to provide discrete optical channels through the joint.

The outer end, i.e., the monitoring end of the probe 10 which is at ambient pressure extends away from a housing or fitting 12 which may be disposed within the outer wall of the pressure vessel (not illustrated), such as a turbopump. The exterior shape or geometry of the fitting 12 is not critical since its purpose is to provide an envelope or receptacle within which the coupling components are assembled and disposed. Additionally, if found desirable, the external wall of the pressure vessel itself may be formed to have the receptacle for the coupling components. The fitting 12 includes three concentric bores 14, 16, 18, the diameter of each of which is progressively larger from the inner bore 14 to the outer bore 18.

The inner bore 14 opens onto the interior of the pressure vessel and the high pressure cryogenic medium therein while the outer bore 18 opens onto the ambient pressure environment. The measuring section or internal section of the probe 10 includes an outer protective sheath 20 within which an inner protective sheath 22 carries the fiber bundles to the pressure vessel, the bore 14 having a diameter substantially equal to the outer diameter of the sheath 20 which is disposed therein and extends into the adjacent intermediate bore 16. A key, slot or the like (not illustrated) rotationally secures the probe within the fitting at the high pressure side.

Disposed within the intermediate bore 16 is a cup shaped split ring 24 having a central opening 26 through which the inner sheath 22 extends, the outer sheath being removed in this location so that a pair of spaced stepped shoulders are formed for capture axially by the respective opposite faces 28, 30 of the ring 24. The outer diameter of the cupped shaped ring 24 is fitted within the bore 16 so that this ring positions the end of the measuring section of the probe 10 remote from the apparatus to be monitored. A washer 32 may be disposed within the bore 16 about the outer sheath 20 and is forced against the face 28 of the ring 24 by spring members 34 acting between the washer 32 and the shoulder 36 formed where the bore 16 steps down to the bore 14. Thus, the cup shaped ring 24 together with the captured probe section is forced in the direction toward the largest bore 18. The importance of this arrangement will be readily understood hereinafter.

Disposed within the bore 16 partly within the annular rim of the ring 24 remote from the bore 14 is an optical coupler 38 having a cylindrical configuration, the outer 35 diameter of the coupler 38 conforming to and being received within the inner aperture of a pressure actuated type seal 40. The outer periphery of the seal 40 is substantially equal to the bore 16 to resist leakage therebetween while the inner periphery seals the coupler 8. The optical coupler 38 comprises a section of rigid, fused coherent optical glass fibers, the fused glass fibers resisting leakage through the coupler while the coherent fiber arrangement transmits an image from one side exactly through to the other side with little or no distortion. Consequently, discrete light channels can be passed through the coupler to and from the sections of the probe on either side of the optical coupler 38.

At the low pressure side of the coupler 38 the monitoring section or ambient pressure section of the probe has a portion of its outer sheath 42 disposed within an annular spacer or bushing 44 having an outer diameter substantially equal to that of the bore 16 within which it is disposed. The bushing 44 a length extends substantially to the plane of the shoulder 46 formed where the bore 16 opens onto the bore 18, and a cup shaped washer or the like 48 having a central bore disposed snuggly about the sheath 42 is positioned in the bore 18 and abuts the bushing 44 at the plane of the shoulder 46. The cup shaped washer 48 has an annular lip 50 facing away from the bore 16, and disposed within the annulus and abutting the interior annulus of the lip 50 is the outside diameter of another split ring 52.

The ring 52 has a substantially central opening 54 through which the inner sheath 56 of the exterior section of the probe extends, the outer sheath 42 being removed in this location so that a pair of spaced stepped shoulders are formed on the outer sheath 42 for capture axially by respective opposed faces of the ring 52 in manner similar to that by which the ring 24 captures the sheath 20 of the measuring section of the probe. Consequently, the adjacent ends of both the measuring and monitoring sections of the probe 10 are readily and simply captured and held in the fitting 12 with the optical coupler therebetween.

Disposed within the large bore 18 is a positioning member 58 having connecting and adjusting features. The member 58 is an elongated member preferably having one end portion comprising a cylindrical form having external threads 60 for reception within the bore 18, the bore 18 being internally threaded. The other end portion 62 of the member 58 has a reduced diameter adjacent an annular flange 64 at the end thereof. The member 58, which effectively is a nut, has a central bore 66 for receiving the probe therethrough. Rotational adjustment of the nut by means of a grasping portion 68 positions the nut axially into abutment with the ends of the ring 52 and the lip 50 of the washer 48. This positions the monitoring section of the probe axially within the fitting 12. Rotational adjustment of the probe within the bore 66 of the positioning member permits alignment of the probe monitoring section with the measuring section of the probe for optimizing the optical coupling. Once the probe is aligned, a simple pressure applying clamp 70 securely locks the probe in place within the member 58.

Consequently, an optical pressure sealing coupling is proposed which provides the combined functions of sealing and coupling an instrumentation probe between a high pressure cryogenic environment and an ambient environment while providing adjustable alignment of discrete optical channels for maximized signal output. The coupling comprises rugged structural elements while securing the sensitive optical components internally therein. It should be understood that the coupling arrangement eliminates the requirement of separately sealing the probe itself against the pressure differential, and the use of the split rings within the bores allows dissassembling of all the components readily while permitting installation access to the light joint. Additionally, the structure and spring members permit the optical components to maintain contact for transmission of signals by its vibration resistant construction.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Optical pressure sealing and coupling apparatus for coupling together a probe measuring section disposed in a high pressure cryogenic environment for measuring data therein and a probe monitoring section disposed in an ambient pressure environment for monitoring the data received from the measuring section, said apparatus comprising means defining a housing, an axial passageway inside the housing extending between an end at said high pressure environment to an end at said ambient pressure environment, means in said passageway for receiving and supporting said measuring section at the high pressure end, locating means in said passageway for grasping and axially capturing said measuring section and for urging said measuring section toward said ambient pressure end, an annular seal in said passageway having an outer periphery in sealable engagement with the periphery of the passageway, a rigid optical coupler comprising fused coherent glass fibers disposed in sealing engagement by the inner periphery of said annular seal and abutting an axial end of said monitoring section, axially adjustable means in said passageway adjacent the ambient pressure end for receiving and supporting the monitoring section of said probe, capturing means in said passageway intermediate said coupler and said adjustable means for grasping and axially capturing said monitoring section, and said adjustable means abutting said capturing means for axially disposing an end of said monitoring section in abutment with said coupler remote from the measuring section.

2. Apparatus as recited in claim 1, wherein said monitoring section is rotatably journalled in said adjustable means and may be rotated to an optically optimum disposition, and means for locking said monitoring section to said adjustable means at a selective rotated disposition.

3. Apparatus as recited in claim 1, wherein said locating means comprises an annular member for grasping and capturing said measuring section, and biasing means for urging said annular member toward said ambient pressure end.

4. Apparatus as recited in claim 1, wherein said adjustable means and said passageway include cooperating threadable means for permitting axial adjustment of said adjustable means in said passageway.

5. Apparatus as recited in claim 4, wherein said adjustable means includes a bore for receiving said monitoring section and permitting said monitoring section to be rotated relative thereto to an optically optimum disposition, and means for locking said monitoring section to said adjustable means at a selective rotated disposition.

6. Apparatus as recited in claim 5, wherein said locating means comprises an annular member for grasping and capturing said measuring section, and biasing means for urging said annular member toward said ambient pressure end.

7. Optical pressure sealing and coupling apparatus for coupling together a probe measuring section disposed in a high pressure cryogenic environment for measuring data therein and a probe monitoring section disposed in an ambient pressure environment for monitoring the data received from the measuring section, said apparatus comprising means defining a housing having three substantially axially aligned bores extending therethrough, a first of said bores opening at one end onto said high pressure environment and at an opposite end onto a second of said bores, the second of said bores opening remote from said first bore onto an end of the third of said bores, the third of said bores opening remote from said second bore onto said ambient pressure environment, said measuring section of said probe being axially disposed in said first bore and having an end extending partly into said second bore, and annular member disposed in said second bore and having means for grasping and axially capturing said measuring section adjacent said end, an annular pressure actuated seal disposed in said second bore, said seal having an outside diameter substantially equal to the diameter of said second bore, a cylindrical rigid optical coupler comprising fused coherent glass fibers disposed in said second bore within the annulus of said seal and adjacent said end of said measuring section, said coupler having an outside diameter substantially equal to the inside diameter of said seal, an axially adjustable positioning member disposed within said third bore and having a portion extending outside said housing, said positioning member having a substantially central passageway extending therethrough for passing a portion of said monitoring section therethrough while permitting a free end of said monitoring section to extend into said second bore, probe capturing means in said third bore axially positioned by said positioning member relatively to said second bore for axially capturing said monitoring section of the probe adjacent said free end, biasing means for urging said end of said measuring section into abutment with said coupler and said coupler into abutment with said free end of said monitoring section, and clamp means for locking said monitoring section of the probe to said positioning member.

8. Apparatus as recited in claim 7, wherein said third bore has a larger diameter than said second bore so as to define an annular shoulder in said third bore adjacent said second bore, said probe capturing means having an annular configuration including an outer diameter larger than said second bore and a face disposed for abutment with said shoulder, and means remote from said face for abutment by said positioning member.

9. Apparatus as recited in claim 7, wherein said biasing means is disposed in said second bore for urging said annular member axially in a direction toward said third bore.

10. Apparatus as recited in claim 9, wherein said second bore has a larger diameter than said first bore so as to define an annular shoulder in said second bore adjacent said first bore, said biasing means acting between said shoulder and said annular member.

11. Apparatus as recited in claim 7, wherein said clamp means is disposed externally of said housing.

12. Apparatus as recited in claim 8, wherein said probe capturing means includes a split ring.

13. Apparatus as recited in claim 7, wherein said annular member comprises a cup-shaped member having a rim overlaying said coupler.

14. Apparatus as recited in claim 13, wherein said cup-shaped member comprises a split ring.

15. Apparatus as recited in claim 14, wherein said second bore has a larger diameter than said first bore so as to define an annular shoulder in said second bore adjacent said first bore, said biasing means acting between said shoulder and said cup-shaped member remote from said rim.

16. Apparatus as recited in claim 15, wherein said probe capturing means includes a split ring.

* * * * *